United States Patent Office 3,702,799
Patented Nov. 14, 1972

3,702,799
POLYMERS OF QUATERNARY AMMONIUM COMPOUNDS USED AS WET STRENGTH AGENTS IN PAPER
Sheldon N. Lewis, Willow Grove, Richard F. Merritt, Fort Washington, and William D. Emmons, Huntingdon Valley, Pa., assignors to Rohm and Haas Company, Philadelphia, Pa.
No Drawing. Continuation-in-part of application Ser. No. 813,724, Apr. 4, 1969. This application Oct. 12, 1970, Ser. No. 80,144
Int. Cl. D21h 3/44
U.S. Cl. 162—168
10 Claims

ABSTRACT OF THE DISCLOSURE

This invention is concerned with monoethylenically unsaturated acid ester monomers, such as those of acrylic or methacrylic acid, containing a quaternary ammonium halide group having a substituent on the quaternary nitrogen atom of the formula —$CH_2CH(OH)CH_2X$ wherein X is chlorine, bromine or iodine. It is also concerned with addition polymers of such monomers, and methods of producing the monomers and polymers. The monomers and polymers are stable at acid pH values, although capable of reacting with other reactants for the hydroxyl and/or halide group. On heating, they are self-reactive and become cross-linked. At alkaline pH values, they become self-reactive and the polymers crosslink themselves by slow reaction even at room temperature. However, the cross-linking reaction becomes quite rapid on heating. The invention also concerns the use of these polymers as wet-strength agents in making paper and as electroconductive aids in the making of various electroconductive papers for electrostatic image reproduction systems.

---

This application is a continuation-in-part of our copending application Ser. No. 813,724 filed Apr. 4, 1969.

DISCUSSION OF PRIOR ART

U.S. Pat. 2,897,200 discloses the alkylation of various dialkylaminoalkyl vinyl ethers in free amine form with various agents including epichlorohydrin. In Example 2 thereof, the patentee indictates that the quaternary nitrogen atom of the compound obtained from diethylaminoethyl vinyl ether has an oxirane group of the formula —$CH_2CHCH_2O$
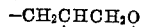

attached thereto. Examples 4 and 5 indicate copolymers are prepared therefrom by emulsion copolymerization.

U.S. Pats. 3,095,390 and 3,287,305 disclose alkylation of N-dialkylaminoalkyl amides of monoethylenically unsaturated acids, such as acrylic acid and methacrylic acid, in free amine form, with various agents including epichlorohydrin. In Example I thereof, the patentee indicates that the quaternary nitrogen atom of the compound obtained from N-(diethylaminoethyl)-acrylamide has an oxirane group, —$CH_2CHCH_2O$

attached thereto. Example 4 of the patent indicates copolymers are obtained therefrom by emulsion copolymerization.

U.S. Pat. 2,965,594 mentions alkylation of various basic dialkylaminoalkyl esters of acrylic acid, methacrylic acid, and so on by means of agents capable of converting the tertiary amino groups to quaternary ammonium groups and also introducing at the same time a carboxylic acid amido or an epoxy group, such as chloroacetamide or epichlorohydrin. There is no working example given for introducing an epoxy group. Actual experimental work on the reaction of such a basic aminoalkyl acrylate or methacrylate has established that the glycidyl group rapidly undergoes undesirable transformations which result in loss of epoxide functionality (one of which apparently involves conversion to an allyl alcohol group of the formula —$CH=CHCH_2OH$), and promote the subsequent gelation of the product to an unusuable solid of unknown complex composition when this monomer is polymerized or copolymerized with other vinyl monomers.

U.S. Pat. 3,150,112 discloses adding an epihalohydrin to a neutral or alkaline aqueous dispersion of an emulsion copolymer of a monomer containing —COOM groups (M being $NH_4$, alkali metals, or an amine radical) or groups having reactive hydrogen atoms, such as OH, primary or secondary amine groups, etc.

Electroconductive paper may be used to distribute electrical stresses in various insulating products; see, for instance, U.S. Pat. No. 3,148,107. Where electrically conductive paper is to be used for nonimpact printing, a substrate, backing, impregnation coating, or layer of electrically conductive material is usually provided. See, e.g., Vaurio and Fird, "Electrically Conductive Paper for Nonimpact Printing," TAPPI, December 1964, vol. 47, No. 12, pages 163A-165A.

Various types of nonimpact printing processes are known, such as electrostatographic, electrographic, "Electrofax," and other processes. As a rule, such processes call for the placing of an electric charge on the paper. This may be accomplished by a corona discharge, for example, and in most processes, the electrical charge is placed on the paper in darkness.

The paper may also be provided with or contain a photoresponsive or photoconductive material or layer. At present, there is popularly used a specially treated zinc oxide coating on the paper. Where light strikes portions of the paper treated with such a light-sensitive material, the electrical charge is dissipated in those areas exposed to the light. As a result, there is left a pattern of charged and uncharged areas.

The charged area will then be effective to attract an oppositely charged powdered, or other usually particulated, image-forming material. Such a powder will not be attracted to the light-affected discharged areas, and the powder may thus be deposited on the paper in a pattern to correspond with charged areas. Generally, such an image-forming material may then be fused, or otherwise treated, on the paper to make the image permanent. Such a material, presently used, is a wax-coated finely divided carbon black, which will fuse when heated on the paper.

Other processes for electrostatic reproduction differ from the above in that the image is created by electrical dissipation of the static charge in nonimage areas. In this and certain other processes (see the Vaurio and Fird reference mentioned above), the common characteristic is again an electrically conductive base paper. This electrically conductive layer of the paper assures a rapid discharge of the charge when and where desired, and also aids in an even distribution of the initial charge.

Probably the most common copy reproduction system of the above types used at present is the direct electrostatic process; see, e.g., Chemical and Engineering News, July 20, 1964, pp. 88–89 and U.S. Pat. 3,052,539. This process is similar to the xerographic method of copy reproduction; however, the conductive substrate is built into the paper rather than being on a separate drum or other device. Other patents relating to conductive paper for electrostatic reproduction include 3,264,137 and 3,248,279.

Some quaternary ammonium group-containing polymers have been used in the making of electroconductive paper.

Thus U.S. Pat. 3,011,918 mentions the use of vinyl benzyl quaternary ammonium compounds. However, these polymers have extremely unpleasant odors. Consequently, the unpleasant fishy odor associated with them makes the operation of coating the paper an unpleasant one and also tends to leave the paper product with a strong residual fiishy odor. In U.S. 3,264,137 there are disclosed besides the vinyl benzyl quaternary ammonium compounds some acryloxyalkyl quaternary ammonium compounds in which the quaternary nitrogen carries either three alkyl groups or two alkyl groups and a benzyl group. The former are beset with the same unpleasant fishy odor as the products of 3,011,918 but the latter have an undesirable tendency to lose conductivity on storage.

DISCLOSURE

In accordance with the present invention, a hydrogen acid salt of a basic ester of the formula

is reacted under acid conditions with an epihalohydrin of the formula

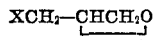

the symbols in the formula being as follows:
X is chlorine, bromine, or iodine,
R is hydrogen or methyl,
A is a $(C_2-C_6)$ alkylene group having at least two carbon atoms in a chain between the adjoined O and N atoms or A may be a polyoxyethylene group of the formula $(CH_2CH_2O)_xCH_2CH_2$ wherein $x$ is 1 to 11 or more, and
Y is an anion, such as a halogen ion ($Cl^-$, $Br^-$, or $I^-$) or the anion of any other acid, such as nitrate, phosphate, acid phosphate, sulfate, bisulfate, methyl sulfate, carboxylate, sulfonate, sulfamate, acetate, formate, oxalate, acrylate, and α-methacryloxyacetate. Preferably, Y is the anion of an acid having an ionization constant, $pK_a$ of 5.0 or less, i.e. a dissociation such that the hydrogen ion concentration is at least $10^{-5}$.

The reaction may be effected at room temperature to about 80° C. Generally, the procedure should be controlled to prevent the temperature exceeding about 80° C., preferably avoiding temperatures above 50° C. The reaction is most conveniently carried out in aqueous media, preferably water itself. The starting salts and the epihalohydrin are adequately water-soluble to make water entirely suitable as the reaction medium. The epihalohydrin is preferably used in stoichiometric amount or in excess thereof. The aqueous medium may contain an auxiliary water-miscible solvent when A is an alkylene group of 4 or more carbon atoms. No catalyst is needed for the reaction. It is, however, essential that the pH be maintained on the acid side during the reaction to prevent undesirable side reactions. The reaction is rapid even when started at room temperature. Its completion can be readily determined by following the drop in amine titre as the amine group is quaternized. Generally, the addition of epihalohydrin to the aqueous starting salt solution is made at as rapid a rate as is consistent with the control of the temperature in the reaction system.

A polymerization inhibitor may be present in the reaction medium. Examples include monomethyl ether of hydroquinone, hydroquinone and phenothiazine. The amount of inhibitor may be from 0.01% to 1% based on the weight of starting salt.

The carbon atoms of the A group of Formula I may be in a simple straight chain or may be in branched-chain arrangement. However, it is preferred that the carbon atom of A that is attached directly to the nitrogen atom has at least one hydrogen attached directly to it to assure that the reaction is not sterically hindered. One of the hydrogen atoms in one or more or all of the ethylene groups of the polyoxyethylene group representing A may be replaced by a methyl group.

The epihalohydrin may be epiiodohydrin or epibromohydrin, but is preferably epichlorohydrin. Similarly, the salt of the monomer may be any of the hydro acid salts, such as hydroiodide or hydrobromide, but is preferably the hydrochloride or the salt formed with nitric acid. One or both of the methyl groups on the nitrogen atom may be cyclohexyl or another alkyl group, but the compound of Formula I in which these groups are both methyl reacts so much more rapidly with the epihalohydrin than that in which they are ethyl that it is believed the dimethyl compound is the best one from a practical standpoint.

The monomeric products of the present invention have the following formula in which the symbols are the same as defined hereinabove.

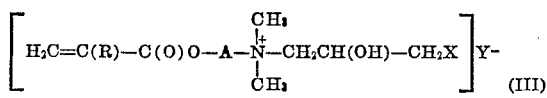

They are obtained in high yield (over 90%) in aqueous reaction medium. The products of the reaction may be concentrated or even isolated from the reaction medium in which they are dissolved by vaporization of the water, preferably under vacuum. However, they can be stored in the form of their aqueous solutions as obtained.

The products are polymerizable and for this purpose, their aqueous solutions may be used directly. Any known polymerization initiator of free radical type effective in aqueous systems can be used. Examples are t-butyl hydroperoxide, ammonium persulfate, and alkali metal persulfates, such as those of sodium or potassium. They are used at the customary dosage of 0.1 to 2% by weight, based on monomer weight. They may be used with sodium hydrosulfite or other reducing agents in redox systems. Instead, the polymerization may be effected by radiation.

These new quaternary ammonium salt monomers may be copolymerized with other polymerizable ethylenically unsaturated monomers, especially by emulsion polymerization procedures, using the initiators or redox systems just mentioned in conjunction, if desired, with suitable emulsifiers of nonionic or cationic type. As emulsifiers, there may be used t-octyl or t-nonyl-phenoxypolyethoxyethanols having from about 10 to 50 or more oxyethylene groups, octadecylamine sulfate, cyclohexyldiethyl(dodecyl)amine sulfate, octadecyltrimethylammonium bromide, polyethoxyamines or mixtures of two or more such emulsifiers.

Any ethylenically unsaturated monomer having a group $H_2C=C<$ may be used for copolymerization with the new monomers of Formula III under conditions such that the polymerization medium is maintained at an acid condition, preferably at a pH of not over 6. Examples of monoethylenically unsaturated monomers having a single $H_2C=C<$ group include α,β-monoethylenically unsaturated acids, such as acrylic acid methacrylic acid, itaconic acid, methacryloxypropionic acid, maleic acid, and fumaric acid; vinyl esters of $(C_1-C_{18})$aliphatic acids, such as vinyl acetate, laurate, and stearate; esters of acrylic acid or methacrylic acid with $(C_1-C_{18})$alcohols, including $(C_1-C_{18})$alkanols, benzyl alcohol, cyclohexyl alcohol, and isobornyl alcohol, such as methyl acrylate or methacrylate, ethyl acrylate or methacrylate, butyl acrylates or methacrylate, 2-ethylhexyl acrylate or methacrylate, octadecyl acrylate or methacrylate, hydroxyethyl methacrylate, hydroxypropyl methacrylate, methoxyethoxyethyl acrylate or methacrylate, ethoxyethoxyethyl acrylate or methacrylate, methoxyethyl acrylate or methacrylate, ethoxyethyl acrylate or methacrylate; vinyl aromatic hydrocarbons (e.g.. styrene, isopropenyl toluene, and various dialkyl styrenes); acrylonitrile, methacrylonitrile, ethacrylonitrile, and phenylacrylonitrile; acrylamide, methacrylamide, ethacrylamide, N-methylol acrylamide, N-monoalkyl and -dialkyl acrylamides and methacrylamides, e.g., N-monomethyl, -ethyl, -propyl, -butyl, and N-dimethyl, -ethyl, -propyl, -butyl, etc., alkacrylamides, e.g., N-monophenyl- and -diphenylacrylamides and -methacrylamides; vinyl ethers, such as butyl vinyl ether; N-vinyl lactams such as N-vinyl pyrrolidone; and olefins, such as ethylene; fluorinated vinyl compounds, such as vinylidene fluoride; β-hydroxyethylacrylate or methacrylate or any of the hydroxyl-containing or amine containing monomers mentioned in columns 2 and 3 of U.S. Pat. 3,150,-112; vinyl chloride and vinylidene chloride; alkyl vinyl ketones; e.g., methyl vinyl ketone, ethyl vinyl ketone, and methyl isopropenyl ketone; itaconic diesters containing a single $CH_2=C<$ grouping, e.g., the dimethyl, diethyl, dipropyl, dibutyl and other saturated aliphatic monohydric alcohol diesters of itaconic acid, diphenyl itaconate, dibenzyl itaconate, di-(phenylethyl) itaconate; allyl, and methallyl esters of saturated aliphatic monocarboxylic acid, e.g., allyl and methallyl esters of saturated aliphatic monocarboxylic acid, e.g., allyl and methallyl acetates, allyl and methallyl propionates, allyl and methallyl valerates; vinyl thiophene; 4-vinyl pyridine; vinyl pyrrole; and ethylenically unsaturated monomers containing a quaternary ammonium group, such as methacryloxyethyl trimethyl ammonium chloride and acryloxyethyl trimethyl ammonium chloride.

The monomers of Formula III are directly useful for copolymerization with acrylonitrile to modify the antistatic, dyeing, and moisture regain properties thereof. The resulting copolymer containing 0.2 to 5% by weight of the quaternary ammonium compound of the present invention can be formed into fibers which can be formed into textile yarns and fabric which show reduced tendency to develop static charges on frictional contact, better dyeing, especially by acid dyes, and better feel because of increased moisture adsorption or regain. Instead of copolymerizing the monomer of the invention directly with the acrylonitrile to form the main component of fibers or films, a homopolymer or copolymer of the monomer of Formula III with one or more other monomers, such as vinyl acetate, ethyl acrylate, styrene or vinyl benzene sulfonate, may be blended in relatively small amount with the acrylonitrile polymer which forms the predominant component of the fiber or film that is subsequently formed from the blend.

A compound of Formula III may be used for the sizing of paper. A small amount in the range of 0.2 to 5% or more by weight of the compound based on dry fiber weight, may be mixed into the paper pulp in the beater or shortly before or after the pulp leaves the beater. A polymerization initiator may be added to the pulp at the same time or shortly before or after the addition of the monomer of Formula III. The effect obtained in the dry paper produced therefrom varies in dependence on the pH of the system. If the pulp is at a pH of less than 7, the paper obtained shows a sizing effect. If the pulp is neutral or alkaline or is rendered alkaline, such as at a pH of 8 to 10, at some point prior to driving of the formed sheet, increased wet strength is also obtained.

In either case an aqueous dispersion of neutral or acid-containing polymers such as poly(ethyl acrylate) obtained by emulsion polymerization may also be added to the pulp. In such event the monomer of Formula III, or a polymer formed thereof in situ serves to anchor the additional polymer to the fibers. Instead of such additional polymer, there may be added an aqueous dispersion of a wax, such as polyethylene, of a pigment or mineral filler, or of a material, such as a long chain alcohol-modified urea formaldehyde resin, which on subsequent calendering of the paper serves to transparentize it.

An alternative method of preparing the polymers of the present invention is to react an epihalohydrin with a polymer containing from 0.25 to 100% by weight of an amine salt of Formula I supra. Such polymer may be obtained by polymerizing the amine salt of Formula I directly or by polymerizing the corresponding amine in free base form and then neutralizing it with a hydrogen acid to form the salt of the amine polymer. Numerous methods of polymerizing (including copolymerizing within the meaning of this term) the amine salts of Formula I and the corresponding amines in free base form are well known and any of these methods may be used. Conventional emulsion or suspension polymerization techniques may be employed. Any of the comonomers listed above for copolymerization with the quaternary ammonium compound of Formula III may be used as comonomers with the amine salts of Formula I or the corresponding amine in free base form.

The reaction of the epihalohydrin and the polymer salt may be carried out in the same way and under the same conditions as that of the epihalohydrin and the monomer of Formula I. The polymer may be dissolved in water or it may be present in the form of an aqueous latex obtained by emulsion polymerization. The epihalohydrin is used in the stoichiometric equivalent proportion to convert whatever proportion of amine units in the polymer to quaternary ammonium units that is desired or, an excess up to 100 may be used.

Reaction of the amine salt polymer (whether homopolymer or copolymer) with the epihalohydrin provides a polymer having units containing quaternary ammonium groups of the formula

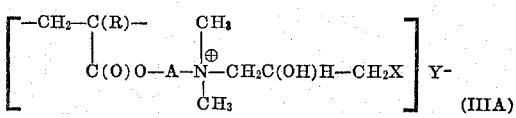

along with some units of the formula

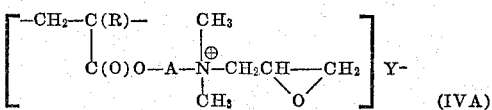

The relative amounts of IIIA and IVA will depend on the exact reaction conditions but, in a typical case, these units will be present largely in the IIIA form. Lowering of the pH apparently reduces the proportion of IVA. At pH values of 6 or less, the propensity for gelation attributable to the glycidyl group of IVA is inhibited (or possibly completely lacking because of absence or almost complete absence of IVA groups) whereas raising the pH to neutral or alkaline conditions results in rapid curing the copolymer even at room temperature to an insoluble condition, the higher the pH and concentration of the polymer the more rapid the curing. Apparently, the groups IIIA are converted to IVA groups when the pH is made alkaline and the alkali-catalyzed transformations of the glycidyl groups can cause cure and insolubilization of the polymer.

If, however, the polymers of the present invention containing the functionality IIIA are diluted to very low solids (2–10%) in water at 5–50° C., then the pH may be raised to 9–12 without gelation. The polymer so obtained is stable for a limited amount of time at low solids (2–10%) even though such a polymer cannot be stored indefinitely without gelation or loss of functionality. Polymers of the present invention when activated by this caustic treatment for a minimum period of 1–5 hours have been found two to three times more efficient as wet strength resins than they are prior to activation. This caustic activation process is of particular significance since polymers treated in such way have special value as wet strength resins for paper when the paper is cured at a pH of 6–10. While the caustic activation process is not practical for the polymer manufacturer because of the previously mentioned stability problems and the required low solids (2–10%), it can be practical for the polymer user, such as a paper mill.

These properties of the polymers containing groups IIIA with or without nominal levels of the groups IVA enable the polymer manufacturer to make reasonably stable polymer compositions, such as latices thereof, and store and ship them to a user, such as a paper manufacturer, for application under any conditions of pH, e.g. at a pH of 2 to 5 for simple sizing, or at a pH of 7 to 11 or higher to cure the polymer in the paper to develop high wet strength.

Homopolymers of a compound of Formula III or copolymers containing both groups IIIA and IVA are generally water-soluble to an extent of at least 1% by weight at room temperature and in most cases dissolve to form aqueous solutions containing as much as 20% or more, the greater the concentration, the greater the viscosity.

The homopolymers are generally useful as flocculants, as in the clarification of water and aqueous suspensions. Thus, the addition to a sewage of about 0.01 to 0.5% by weight, based on the weight of suspended solids, of a homopolymer of a monomer of Formula III, serves to flocculate the suspended matter and facilitate its removal by filtration or by settling and decantation. The homopolymers are thus useful in the flocculation of aqueous suspensions of many types, and especially of domestic and industrial wastes having neutral, acidic or alkaline character. As mentioned hereinbefore, they can be used as paper sizing and wet strength agents and as anchoring agents for other sizing materials applied in aqueous dispersions or suspensions. They are also effective as retention aids in the preparation of mineral filled papers wherein they enhance the anchoring of the filler to the fibers and thereby clarify the white water obtained. The sizing and flocculation effects are generally effective at all pH values of the systems to which they are applied.

The treatment of paper pulp with the homopolymers (particularly after caustic activation) under neutral or alkaline conditions followed by beating provides a remarkable increase in wet strength. The amount of polymer applied for this purpose may range from 0.1 to 7% or more by weight, based on the dry weight of fiber in the pulp, the wet strength increasing with increase in proportion up to about 4 to 5% after which the wet strength levels off and the sizing effect increases.

The water-soluble copolymers containing 25% or more of units of Formula IIIA whether or not units of Formula IVA are also present therein and also those whose units consist essentially of units IIIA and IVA are useful for the same purposes as mentioned hereinabove for the homopolymers of a monomer of Formula III. For use as a wet-strength resin for paper, the polymers preferably contain about 35 to 100% of units of Formula IIIA and units of IVA and for optimum performance these resins are subjected to the caustic activation process at 2–10% solids just before use. Preferred copolymers are those of cationic character but having up to 25% by weight of acid-containing units (such as those of acrylic acid or methacrylic acid) therein at the time of application to the pulp when used for the purpose of imparting wet strength to the paper formed therefrom. In general, optimum results are obtained when the cationic copolymer contains about 5 to 20% by weight of acid-containing units. The introduction of the acid groups into the polymer may be accomplished by (1) direct copolymerization or by (2) hydrolysis of ester units in the copolymer or monomeric ester units during polymerization, quaternization, or alkaline activation as mentioned hereinabove. Alternatively, part of the acid groups may be introduced by (1) and part by (2). For example, an acid salt of a dialkylaminoalkyl acrylate may be copolymerized with an acid, such as acrylic acid, to produce a copolymer containing up to 25% by weight of acid and the balance of the aminoalkyl acrylate, the copolymer being subsequently quaternized with an epihalohydrin. In another instance, a dialkylaminoalkyl acrylate salt of an acid may be copolymerized with an acrylic ester, such as methyl acrylate. After quaternization with the epihalohydrin, the quaternized copolymer may be subjected to the abovementioned alkaline activation which not only converts the quaternary units to the oxirane form represented by Formula IVA but also hydrolyzes a substantial proportion of the alkyl acrylic ester (and, possibly, a small amount of the dialkylaminoalkyl acrylate groups) thereby introducing carboxylic acid groups into the copolymer. In another modification, a dialkylaminoalkyl acrylate in the base form may be emulsion polymerized alone or in admixture with a comonomer, such as methyl acrylate. During the emulsion polymerization, which occurs under alkaline conditions, the dialkylaminoalkyl acrylate undergoes hydrolysis which may convert as much as 5% to 20% or more of these acrylate units into acid-containing units. If an alkyl ester is also present in the polymer, these groups also are appreciably hydrolyzed to contribute acid groups to the polymer. The resulting copolymer is then quaternized with an epihalohydrin, optionally subjected to alkaline activation (especially) if more acid groups are desired, and applied to the paper pulp.

Copolymers containing from 0.25% to 25% or more by weight of units of Formula IIIA are useful for many purposes. For example, copolymers of acrylonitrile with 0.25 to 15% of units of Formula IIIA are particularly useful for forming fibers and films having improved dyeability, greater resistance to the development of electrostatic charges by frictional contact, and better feel because of greater moisture adsorption. Copolymers of about 0.5% to 30% or more of a monomer of Formula IIIA with an ester of acrylic acid or of methacrylic acid such as ethyl acrylate, butyl acrylate, 2-ethylhexyl acrylate, methyl methacrylate with or without styrene or vinyltoluene, are quite satisfactory for the stabilization of wool fabrics against shrinkage on washing, for the bonding of nonwoven fabrics, for the finishing of leather, as a binder for pigmented compositions, for the pigment-dyeing of textiles, for the production of mineral-coated papers, and for lithographic inks, for the sizing of paper, and as thermosetting coatings for application to metals, wood, plastics, glass, masonry of all types, plaster walls, etc.

Copolymers of (a) about 0.5% to 30% by weight or more of a monomer of Formula IIIA and/or IVA with (b) methacryloxyethyl trimethyl ammonium chloride or acryloxyethyl trimethylammonium chloride are of special value in providing paper with higher conductivity for use in specialty applications such as electrostatic copy paper, electrographic printing, and other applications where paper with lower than normal electrical resistivity is required. These water-soluble linear copolymers of the present invention may have molecular weights in the range of about 20,000 to 2,000,000 or more and may be made by the direct polymerization of the quaternary monomers of types (a) and (b) or their salts. Alternatively, a homopolymer of dimethylaminoethyl acrylate or methacrylate may be made and this amine-containing polymer may be simultaneously quaternized with the components of a mixture of an epihalohydrin and a methyl halide, such as a mixture of epichlorohydrin and methyl chloride, in the proportions to provide 0.5 to 30% by weight of (a) and the balance of component (b) of the copolymer.

When polymers in the lower molecular weight range are desired, the polymerization of the amine, its salt, or its quaternary may be effected at elevated temperatures, e.g. 40 to 60° C. or higher using conventional initiator systems, such as ammonium persulfate with or without sodium hydrosulfite. The higher molecular weight polymers may be obtained at lower temperatures, such as 5 to 10° C. and using concentrations of 60% or more with dilution to facilitate handling as polymerization progresses.

To prepare an electroconductive paper, the copolymers of (a) and (b) hereinabove defined may be applied to the paper, or cellulosic web, by the conventional methods used for that purpose, e.g., coating, dipping, brushing, or by wet end addition, etc. The paper used may have a basis weight of 30 to 75 lbs., preferably 30–55 lbs., per 3000 sq. ft. The amount of polymer applied to the paper will generally vary within the range of about 1 to 8% (weight) pick-up, depending upon the particular polymer and paper combination used and the degree of electroconductivity which is desired. In some cases, still less might be used. These seems to be no operative upper limit to the amount of polymer applied, except to the extent this is determined by economics. It will therefore be appreciated and understood that the overall range of from about 1% to about 8% pick-up (by weight) is simply a statement of the required amount of polymer to confer electroconductivity properties to the cellulosic web substrate which will adapt it to most commercial uses mentioned above.

As compared to papers made with the water-soluble quaternary ammonium polymers heretofore recommended for improving the electroconductivity of electrostatic reproductive paper, the papers made with the copolymers of the present invention containing 0.5 to 30 weight percent of units of Formula IIIA and/or IVA with the balance to make 100% of (meth)acryloxyethyltrimethylammonium chloride units have the advantage of retaining their electroconductivity for longer periods of time. This is apparently attributable to the fact that on drying the paper after impregnation or coating thereof with these copolymers, they are cross-linked to a water-insoluble condition.

The fact that these copolymers are somewhat cross-linked on drying also provides an additional advantage of reducing the tendency to block or eliminating it entirely so that the coated paper carrying the electroconductive material can be rolled on itself without fear of damage when it is unrolled for later use. Also, the cross-linked condition reduces the sensitivity to organic solvents and aqueous media so that the topcoating layers of the photoconductive material such as zinc oxide in a binder dissolved or dispersed in a solvent or in an aqueous medium does not cause any appreciable leaching of the electroconductive agent from the paper at the time of application of the topcoating. Examples of such topcoating layers include styrene-butadiene latices, solutions in an organic solvent or dispersions in water of a polymer containing from 3 to 50% by weight of acid such as a copolymer of styrene and maleic anhydride, a copolymer of 95% butyl acrylate and 5% itaconic acid or of 70% ethyl acrylate and 30% acrylic acid or methacrylic acid, partially hydrolyzed polyvinyl acetate and alkali-soluble cellulose esters such as carboxyethyl cellulose as well as water-soluble cellulose ethers such as hydroxyethyl cellulose. Such topcoating layers contain zinc oxide as well as one of the binders just mentioned and may contain a dye-sensitizer.

To assist those skilled in the art to practice the present invention, the following modes of operation are suggested by way of illustration, parts and percentages being by weight and the temperature in ° C. unless otherwise specifically noted.

(1)(a) A 4,000 ml. round-bottom 4-neck flask fitted with a reflux condenser, 2 addition funnels, stirrer, and thermometer is charged with 2,600 g. of de-ionized water. The air is removed with a nitrogen purge and the water is heated to 55° C. One addition funnel is charged with 16 g. of ammonium persulfate dissolved in 200 g. of water. The other funnel is charged with the monomer emulsion prepared from 417 g. water, 63 g. of a 70% solution of t-octylphenoxypoly(40)ethoxyethanol, 400 g. of dimethylaminoethyl methacrylate and 400 g. of ethyl acrylate. Both monomer emulsion and initiator solutions are gradually added over a one-hour period which is appropriate to maintain the polymerization temperature at 55–56° C. The resulting aqueous polymer dispersion contains about 20% solids with a pH of 7.7. To 3,660 g. of this dispersion is added 183 g. of 37% HCl (1 equivalent). The dispersed polymer immediately becomes soluble, whereupon 220 g. (1.25 equivalent) of epichlorohydrin is added. After 24 hours at 25° C. amine titration indicates complete quaternization. The pH of the polymer solution is adjusted from 6.5 to 2 with 37 g. of 37% HCl. At this point, the resulting solution contains 24% polymer solids.

(b) The quaternary ammonium polymer solution is diluted to 5% solids with water containing 14% by weight of NaOH based on polymer solids to provide a final pH of 11. After one hour, the pH falls to 9 and within 3 hours at 25° C., the polymer is ready for use. At that time, about 10 to 15% of the ethyl acrylate groups have been hydrolyzed to acrylic acid groups. Further aging (with concomitant ethyl acrylate hydrolysis) at alkaline pH for a limited period is not detrimental. The effect of the alkaline pretreatment on wet strength properties is given in Table 1. The procedure followed is:

(c) Bleached kraft "Alberta Hi-Brite" pulp slurry is beaten at 2.5% solids to a Canadian Standard Freeness of 470 ml. and the pulp is diluted to 1% solids and adjusted to pH 7.8 with NaOH. The polymer solutions of paragraphs (a) and (b) are added to separate batches of the pulp at 1.0% solids based on dry pulp weight. The pulp is sheeted at a final consistency of 0.04%. The sheets are then dried at 200° F. for two minutes. The wet tensile strength (lbs./in.) is determined on a Scott IP–4 tester, after immersion in 75° F. water for one hour.

TABLE 1

| Polymer used | Percent polymer on dry pulp | Wet tensile (lbs./in.) | |
|---|---|---|---|
| | | 1 day | 28 days |
| Paragraph (a) above | 1 | 4.1 | 7.6 |
| Paragraph (b) above | 1 | 12.5 | 14.4 |
| Kymene 557,[1] untreated | 1 | 9.4 | 12.1 |
| Kymene 557, base treated | 1 | 6.8 | 9.1 |

[1] A commercial polyamide resin bodied with epichlorohydrin having a pH of about 4, U.S. patent 2,926,116.

Shorter base treatment times than 3 hours or initial pH values below 11 produce polymers which provide wet strengths intermediate to those listed above.

(2) The apparatus described in procedure (1) is used and the flask is charged with 2,600 g. of de-ionized water, purged with nitrogen and heated to 55° C. One addition funnel is charged with 4 g. of ammonium persulfate dissolved in 200 g. of water while the other contains a monomer emulsion prepared from 417 g. H$_2$O, 63 g. of a 70% solution of t-octylphenoxypoly(40)ethoxyethanol, 280 g. dimethylaminoethyl methacrylate, and 520 g. n-butyl acrylate. The initiator and monomer feeds are adjusted to maintain the polymerization at 55–56° C. and requires one hour. The polymer dispersion contains 19.4% solids with a pH of 8.1. To 300 g. of this dispersion is added 11 g. (1 equivalent) of 37% Hcl dissolved in 300 g. of H$_2$O. The polymer immediately becomes soluble whereupon 13.2 g. (1.25 equivalents) of epichlorohydrin is added. After 3 days at 25° C., amine titration confirms the absence of polymeric amine and therefore complete quaternization. The ambient pH of 6.5 of the polymer solution is adjusted to 2.0 with 6.0 g. of 37% HCl and an 11.7% solids solution is obtained.

The resulting polymer is beater-deposited at various levels on bleached sulfite pulp in the manner described in (1)(c) above and the final paper sheets tested for sizing efficiency by measuring the change of brightness of the underside of each sheet while it supports on its upper surface an excess of a commercially available permanent blue-black ink (Skrip No. 232). Ink resistance is reported in terms of the number of seconds it takes for this brightness to drop from 100% to 70%. The instrument is calibrated by using a white sheet to represent 100% brightness. Table 2 below tabulates this data.

TABLE 2

| Polymer percent by weight on weight of dry pulp | Seconds to 70% reflectance | |
|---|---|---|
| | 1 day age | Cured (300° F., 5 min.) |
| 0.5 | 562 | 666 |
| 1.0 | 2,950 | 2,050 |
| 2.0 | 5,000 | 6,000 |

(3) A 22 liter 4-neck flask is fitted with thermometer, stirrer, condenser, and 4 addition funnels by means of appropriate adapters. The flask is charged with 6,000 g. of deionized $H_2O$ and 25 ml. of 0.1% $FeSO_4$ solution. This solution is degassed with a nitrogen purge and heated to 65° C. The addition funnels (a, b, c, d) are charged in the following manner: (a) a solution of 1,200 g. dimethylaminoethyl methacrylate, 735 g. 37% HCl, and 735 g. de-ionized $H_2O$, (b) 1,200 g. of methyl acrylate, (c) a solution of 12 g. of ammonium persulfate in 900 g. of $H_2O$ and (d) a solution of 12 g. of sodium metabisulfite in 900 g. of $H_2O$. Solutions a, c, and d are added uniformly over a 90-min. period whereas solution b is added over a 60-min. period. The rate is such that the temperature is maintained at 65° C. The polymer solution is cooled to 25° C. and 2,330 g. of $H_2O$ is added to provide a 19.3% solids solution. The solution is stirred and 885 g. (1.25 equivalents) of epichlorohydrin is added. After 16 hrs. at 25° C. the reaction is complete as judged by lack of amine titer. This 23.8% solids polymer solution is adjusted to pH 2 with 20 g. of 37 HCl.

(4) A flask fitted with a thermometer, stirrer and an addition funnel is charged with 2,000 g. of de-ionized $H_2O$ and 962 g. of 37% HCl. A supply of dimethylaminoethyl methacrylate (1,570 g.) is gradually added and the temperature maintained at 25° C. with extenal cooling. The epichlorohydrin (1,000 g.) is added all at once and the temperature maintained at 25–30° for 8 hours. Amine titration of this solution confirms the quaternization of the amine function. The 51.6% solution of quaternary monomer (Br No.=31.0, calcd. 28) is essentially entirely (99%) in chlorohydrin form (Formula III) (thiosulfate/oxirane <1%) and is utilized as a solution.

(5)(a) A 1,000 ml. 4-neck flask is fitted with a reflux condenser, thermometer, stirrer and 4 addition funnels by means of appropriate adapters. The flask is charged with 645 g. de-ionized $H_2O$ and 1 ml. of 0.2% $FeSO_4$ solution and heated to 50° C. while being purged with nitrogen. The 4 addition funnels (a, b, c, d) contain: (a) 50 g. of methyl acrylate; (b) 250 g. of a 20% solution of the quaternary monomer obtained in (4) above; (c) 2 g. of ammonium persulfate dissolved in 25 g. $H_2O$; and (d) 2 g. sodium metabisulfite in 25 g. of $H_2O$. The additions are carried out over 0.5 hr. to maintain the temperature at 48–50° C. The completely soluble resin copolymer at 12.7% solids is adjusted to pH 2 with 2 g. of 37% HCl.

(b) Part (a) is repeated except that the proportions of the monomers are 20 g. of methyl acrylate and 400 g. of a 20% solution of the quaternary monomer obtained in (4) above and the adjustment to pH of 2.0 is effected with 69% concentrated nitric acid.

(6) A polymerization flask fitted with a stirrer, condenser and thermometer is charged with 200 g. of a 33.2% solution of the monomer of (4) above. The following initiator system is rapidly added: 0.4 ml. of a 0.1% $FeSO_4$ solution, 0.8 g. ammonium persulfate, and 0.8 g. of sodium hydrosulfite. The exotherm begins immediately and polymerization is complete within 0.5 hr. The solution is diluted with 133 g. of $H_2O$ to 17% solids and the pH is adjusted to 2 with 1 g. of 37% HCl.

(7) A reaction vessel similar to those previously described is charged with 632 g. of $H_2O$ and 2 ml. of 0.1% $FeSO_4$ solution. This solution is heated to 70° C. and purged with nitrogen. The supply containers of all 4 (a, b, c, d) addition funnels are charged in the following manner: (a) a solution of 2.0 g. of ammonium persulfate in 50 g. of $H_2O$; (b) 2.0 g. of sodium metabisulfite dissolved in 50 g o.f $H_2O$; (c) a monomer mixture of 90 g. of dimethylaminoethyl acrylate and 100 g. of methyl acrylate; and (d) 67.2 g. of 37% hydrochloric acid. The kettle is then primed with 7 ml. of the HCl solution and 5 ml. of the initiator solution. All the remaining solutions are gradually added over a 1-hr. period such that the temperature is maintained between 69 and 71° C., An additional 10 g. of dimethylaminoethyl acrylate is then added over a 5 min. period. The completed solution polymer has a pH of 3.1 at 23.7% solids. A 300 g. sample of this solution is diluted with 100 g. of $H_2O$ and 23.6 g. (1.25 equivalents) of epichlorohydrin is added. After 18 hours at 25°, amine titer confirms complete quaternization whereupon 4.9 g. of 37% HCl is added to provide the final resin or polymer solids at 22.4% solids at pH 3.8.

(8) A polymerization flask fitted with three addition funnels is charged with 148 g. of $H_2O$ and sparged with nitrogen while being heated to 55° C. The 3 funnels (a, b, c,) are charged as follows: (a) a solution of 0.4 g. of sodium metabisulfite in 10 g. of $H_2O$; (b) a solution of 0.4 g. of ammonium persulfate in 10 g. of $H_2O$; and (c) a monomer emulsion consisting of 8 g. methyl methacrylate, 12 g. of N,N-dimethylaminoethoxyethyl methacrylate, 10 g. of $H_2O$ and 1.4 g. of a 70% solution of tert-octylphenoxypoly(40)ethoxyethanol. The solutions are gradually added over a 50-minute period to maintain the temperature at 55° C. Upon completion of the polymerization, a solution of 5.75 g. of 37% HCl in 300 g. of $H_2O$ is slowly added. The dispersion immediately clarified to provide a 4.4% solids solution. To this solution (100 g.) is added 100 g. of $H_2O$ and 1.29 g. of epichlorohydrin. Within 10 days at 25° C. the quaternization is complete and the 2.6% solids solution is then adjusted to pH 3 with 37% HCl.

(9) The previously described polymerization flask is charged with 608 g. of $H_2O$ and 2 ml. of 0.1% $FeSO_4$ solution. The contents are purged with nitrogen while being heated to 70° C. The 4 addition funnels (a, b, c, d) are charged as follows: (a) a solution of 2.0 g. of ammonium persulfate in 50 ml. of $H_2O$; (b) a solution of 2.0 g. of sodium metabisulfite dissolved in 50 ml. of $H_2O$; (c) a monomer mixture of 100 g. of dimethylaminoethyl methacryalte and 100 g. of methyl acrylate; and (d) a solution of 31.8% g. of concentrated $H_2SO_4$ dissolved in 60 g. of $H_2O$. The additions are complete within an hour to provide a clear 22.9% solids polymer solution at pH 3.0. The polymer solution (300 g.) is treated with 22 g. of epichlorohydrin and quaternization is complete within 3 days at 25° C. The final resin at 26.8% solids is adjusted to pH 2 with $H_2SO_4$.

(10) Five percent aqueous solutions are prepared, as described in the first two sentences of (1)(b) hereinabove, of each of the following products:

(1) Polymer obtained in (1)(a) above
(2) Polymer obtained in (2) above
(3) Polymer obtained in (3) above
(5) Polymer obtained in (5)(a) above
(6) Polymer obtained in (6) above
(7) Polymer obtained in (7) above
(8) Polymer obtained in (8) above
(9) Polymer obtained in (9) above The resulting alkaline solutions (containing various amounts of acrylic acid and/or methacrylic acid by virtue of alkaline hydrolysis of part of the alkyl and/or dialkylaminoalkyl acrylate or methacrylate groups) are applied to paper pulp at various levels in the manner described in (1)(c) above and papers are formed therefrom with the results given in Table 3.

TABLE 3

| Polymer | Polymer percent (wt.) based on dry pulp (wt.) | Sheet basis weight, lb./3,000 sq. ft. | Wet tensile strength (lb./in.) 1-day | Wet tensile strength (lb./in.) 28 days |
|---|---|---|---|---|
| Control | 0 | 38 | 0.5 | 0.5 |
| 1 | 0.25 | 38 | 7.4 | 8.6 |
|   | 0.50 | 38 | 9.9 | 11.0 |
|   | 1.00 | 38 | 12.5 | 14.4 |
| 2 | 0.25 | 38 | 6.6 | 7.0 |
|   | 0.50 | 38 | 8.8 | 9.5 |
|   | 1.00 | 38 | 9.6 | 9.8 |
| 3 | 0.25 | 38 | 6.1 | 7.1 |
|   | 0.50 | 38 | 8.4 | 9.9 |
|   | 1.00 | 38 | 12.0 | 14.5 |
| (5)(a) | 0.25 | 38 | 4.9 | 5.9 |
|   | 0.5 | 38 | 6.7 | 7.5 |
| 6 | 0.25 | 38 | 7.8 | 7.9 |
|   | 0.50 | 38 | 9.6 | 10.3 |
| 7 | 0.25 | 38 | 3.1 | 3.4 |
|   | 0.50 | 38 | 4.0 | 5.2 |
| 8 | 0.25 | 38 | 4.2 | 5.1 |
|   | 0.50 | 38 | 5.6 | 6.2 |
| 9 | 0.25 | 38 | 3.9 | 4.7 |
|   | 0.50 | 38 | 4.6 | 5.6 |

(11) There is charged to a glass reaction vessel 978 g. of $H_2O$ and 2 ml. of 0.1% $FeSO_4$ solution. This solution is purged with nitrogen and heated to 70° C. The 3 addition funnels (a, b, c) are charged as follows: (a) 5.3 g. of ammonium persulfate dissolved in 56 g. of $H_2O$; (b) a solution of 5.3 g. of sodium metabisulfite in 56 g. of $H_2O$ and (c) a monomer emulsion consisting of: 100 g. of styrene, 100 g. of methyl methacrylate, 15.3 g. of a 70% solution of tert-octylphenoxypoly(40) ethoxyethanol, and 130 g. of the 51.6% copolymer solution obtained in (4) above.

The additions are conducted concurrently such that the exotherm maintains the temperature at 70° and requires 2 hours. The completed copolymer dispersion is of 19.6% solids (20% theoretical) and has a viscosity of 5 centipoises.

(12)(a) Preparation of 95 DMAEMA·$HNO_3$/5 MAA copolymer quaternized with epichlorohydrin A polymerization flask is charged with 638.3 g. of deionized water and sparged with nitrogen for 1 hr. The following materials are then added in the order given: 120 g. of 69% $HNO_3$, 209 g. of dimethylaminoethyl methacrylate, 11.0 g. of methacrylic acid, 10 ml. of a 0.1% solution of $FeSO_4$, 1.5 g. of ammonium persulfate, and 1.5 g. of sodium hydrosulfite. An exothermic reaction raises the flask temperature from 32° C. to 45° C. After 45 minutes, another 0.2 g. of ammonium persulfate and 0.2 g. of sodium hydrosulfite are added, followed by 0.1 g. of ammonium persulfate and 0.1 g. of sodium hydrosulfite after another 30 minutes. A final charge of 0.05 g. of ammonium persulfate and 0.05 g. of sodium hydrosulfite is added 30 minutes later. The polymer obtained has a Brookfield viscosity of 155 centipoises at 28.7% total solids and a polymeric amine content of 1.34 milliequivalents/ g. by titration. A 200 g. portion of this solution is diluted with 200 g. of water, the pH adjusted to 5.5 with aqueous 50% sodium hydroxide, and 32.4 g. of epichlorohydrin is added in one portion. After 16 hours at ambient temperature, quaternization of the amine is complete as judged by titration. The pH is adjusted to 2.1 with 69% $HNO_3$, and the final solution has a Brookfield viscosity of 35 centipoise at 19.1% total solids.

(b) Part (a) hereof is repeated except that the relative proportions of dimethylaminoethyl methacrylate (DMAEMA) and acid are as follows:

(1) 90 DMAEMA: 10 methacrylic acid
(2) 80 DMAEMA: 20 methacrylic acid
(3) 90 DMAEMA: 10 acrylic acid
(4) 80 DMAEMA: 20 acrylic acid
(5) 100 DMAEMA: 0 acid (13)(a) Preparation of 80 DMAEMA·HCl/20 AA copolymer quaternized with epichlorohydrin A polymerization flask is charged with 960 g. of deionized water and sparged with nitrogen for 1 hr. The following materials are added in the order given: 112 g. of concentrated hydrochloric acid, 176 g. of dimethylaminoethyl methacrylate, 44 g. of acrylic acid, 10 ml. of a 0.1% solution of FeSo, 1.5 g. of ammonium persulfate and 1.5 g. of sodium hydrosulfite. An exothermic reaction raises the flask temperature from 33° to 45° C. After 45 minutes, another 0.2 g. of ammonium persulfate and 0.2 g. of sodium hydrosulfite are added, followed by 0.1 g. of ammonium persulfate and 0.1 g. of sodium hydrosulfite added 30 minutes later. The polymer obtained has a Brookfield viscosity of 135 centipoise at 20.5% total solids. The polymeric amine present has a pKa of 8.3. A 300 g. portion of the reaction mixture (pH 1.0) is diluted with 300 g. of water and the pH is adjusted to 5.8 with aqueous sodium hydroxide solution, and 30.5 g. of epichlorohydrin is added. After 16 hours at ambient temperature, quaternization of the amine is complete as judged by titration. The pH of the solution is adjusted to 1.0 with hydrochloric acid. The final resin is a clear solution with a Brookfield viscosity of 157.5 centipoise at 14.1% total solids.

(b) Part (a) hereof is repeated except that the relative proportions of dimethylaminoethyl methacrylate (DMAEMA) and acid are as follows:

(1) 90 DMAEMA: 10 methacrylic acid
(2) 90 DMAEMA: 10 acrylic acid
(3) 100 DMAEMA: 0 acid (c) The quaternary polymers of Procedures (12) and (13) with and without alkaline activation are applied as wet strength resins in a 1:1 blend of hardwood and softwood bleached kraft pulps beaten to 360 ml. Canadian Standard Freeness. The sheets are made at pH 7.8 with a basis weight of 37 lbs./3000 sq. ft. The activation is effected on a 10% polymer solids solution with 14% NaOH based on weight of resin solids over a period of two hours. The level of application to the pulp is 0.25 or 0.5% based on fiber weight. The results are shown in Table 4.

TABLE 4

| Polymer | Activated | Percent polymer based on fiber wt. | Wet tensile strength (lbs./in. width) 1 day | Wet tensile strength (lbs./in. width) 18 days |
|---|---|---|---|---|
| (5)(b) | No | 0.5 | 2.7 | 3.2 |
| (5)(b) | Yes | 0.5 | 4.3 | 5.0 |
| (13)(b)3 | No | 0.5 | 2.5 | 3.3 |
| (12)(b)5 | No | 0.5 | 2.5 | 3.2 |
| (13)(b)1 | No | 0.5 | 2.8 | 3.7 |
| (12)(b)1 | No | 0.5 | 2.4 | 3.0 |
| (12)(b)2 | No | 0.5 | 2.5 | 3.0 |
| (13)(b)2 | No | 0.5 | 2.8 | 3.5 |
| (12)(b)3 | No | 0.5 | 2.3 | 2.8 |
| (12)(b)4 | No | 0.5 | 2.4 | 2.9 |
| (12)(a) | No | 0.5 | 2.4 | 3.1 |
| (5)(b) | Yes | 0.25 | 3.8 | 3.8 |
| (12)(a) | Yes | 0.25 | 4.4 | 4.4 |
| (12)(a) | Yes | 0.50 | 5.3 | 5.6 |
| (12)(b)1 | Yes | 0.25 | 3.8 | 4.6 |
| (12)(b)1 | Yes | 0.50 | 5.4 | 5.7 |
| (13)(a)3 | Yes | 0.25 | 3.1 | 3.7 |
| (13)(a)3 | Yes | 0.50 | 5.3 | 5.5 |
| Kymene 557 | No | 0.25 | 2.3 | 2.8 |
| Do | No | 0.50 | 3.2 | 3.9 |

(14)(a) A mixture of 62.8 g. of water, 27.0 g. of methacryloxyethyl trimethyl ammonium chloride, and 5.2 g. of the 51.6% solution of the quaternary monomer obtained in (4) above is purged with nitrogen, heated to 65° C. and then 1.0 g. of a 0.1% solution of $FeSO·7H_2O$ in water, 0.3 g. of ammonium persulfate, and 0.3 g. of sodium hydrosulfite are added. After one hour, the mixture is heated to 85° C. and 0.05 g. of ammonium persulfate and 0.05 g. of sodium hydrosulfite is added. After 1 hour, the mixture is cooled to provide a clear solution, 30.2% solids, Brookfield viscosity of 480 centipoises and pH of 1.5.

(b) One part of the polymer of part (a), activated with aqueous caustic equivalent to the amount of structure IIIA incorporated into the polymer, is mixed with one part of a hydroxyethylated starch available commercially under the name Pen-Gum-280 and one part of kaolinite clay in a formulation of 30% solids. This formulation is applied at various levels to a paper base stock (a 40 lb./3000 sq. ft. paper made from bleached pulp beaten to a Canadian Standard Freeness of 200 ml.) typical of that used for Electrofax® copy paper by means of wire wound rods, and dried for one minute at 180° F. Surface resistivity at 15% relative humidity is measured using ASTM Method D256–61. The results are summarized in Table 5.

TABLE 5

| Conductivity aid | Conductivity aid, lbs./3,000 sq. ft. paper | Surface resistivity ohms/square |
|---|---|---|
| Above copolymer | 0.5 | 1.3×10¹¹ |
| Do | 1.0 | 5.0×10¹⁰ |
| Do | 2.5 | 1.4×10¹⁰ |
| Do | 5.0 | 7.6×10⁹ |
| Commercial product | 0.5 | 8×10¹⁰ |
| Do | 1.0 | 2.4×10¹⁰ |
| Do | 2.5 | 5.9×10⁹ |
| Do | 5.0 | 3.3×10⁹ |
| None (untreated paper) | | 1×10¹⁴ |

(15)(a) Separate sheets of a paper of the type mentioned in (14)(b) are coated with 30% solutions of (1) poly(methacryloxyethyltrimethylammonium chloride) and (2) a copolymer containing about 13% of oxirane units of Formula IVA wherein R is methyl obtained by the alkali-activation (using an equivalent amount of NaOH) of a copolymer containing about 13% of units of Formula IIIA wherein R is methyl and X is chlorine with 87% of units of methacryloxyethyltrimethylammonium chloride. The amount applied is such as to yield a coating of about 3½ lb./3000 sq. ft. after drying. The paper carrying the coating of (1) shows strong blocking whereas that having coating (2) when rolled on itself could be unrolled without damage.

(b) The papers obtained in part (a) are given a dielectric coating layer by topcoating with the following formulation:

Material: Parts
Ammonium salt of a copolymer of 50% butyl acrylate, 25% methyl methacrylate, 10% styrene, and 15% methacrylic acid (35% aqueous solution) _____ 57.2
Copolymer of 32% ethyl acrylate and 68% methacrylic acid (20% aqueous dispersion) _ 1.25
Photoconductive ZnO (Photox 801) _____ 140
Bromphenol Blue in methanol (1/2% solution) _____ 5.6
Ammonium hydroxide (28%) _____ 0.8
Water _____ 27.1

This coating is applied at 15 lb./3000 sq. ft. and air-dried. The copolymer having oxirane quaternary units (IVA) shows reduced migration into the dielectric coating and a better image is produced when the papers are used in electrostatic reproduction processes.

(16) There is charged to a glass reaction vessel 1200 g. of water, 40 g. of a 70% solution of tert-octylphenoxypoly(40)ethoxyethanol and 8 g. of sodium metabisulfite. This solution is purged with nitrogen and heated to 55° C. Two addition funnels (a, b) are charged as follows: (a) with a mixture of 120 g. of butyl acrylate, 120 g. of styrene, and 160 g. of dimethylaminoethyl methacrylate; and (b) with 8 g. of ammonium persulfate dissolved in 90 g. of water. The solutions are added concurrently over 1 hour while the temperature is maintained at 55–60° for this time and for one hour thereafter. Two hundred grams of this polymer dispersion is mixed with 500 g. of water, 10.2 g. of 37% aqueous hydrochloric acid and 13.7 g. of epichlorohydrin. After 24 hours at ambient temperature, the amine present has been quaternized as evidenced by acid-base titration. The pH of the resin dispersion is adjusted to 2.0 with hydrochloric acid, and the final resin dispersion has a viscosity of 25 centipoise at 8.9% solids.

The resulting polymer is beater-deposited at various levels on bleached sulfite pulp in the manner described in (1)(c) above, and the final paper sheets tested for sizing efficiency as described in (2) above. Table 6 below tabulates this data.

TABLE 6

| Polymer, percent by weight on weight of dry pulp | Ink resistance, seconds to 70% reflectance | |
|---|---|---|
| | Papers aged 1 day | Paper cured (300° F. 5 min.) |
| 0.5 | 57 | 50 |
| 1.0 | 910 | 1,450 |
| 2.0 | 2,550 | 4,400 |

(17)(a) In a glass polymerization vessel, a mixture of 210 g. of deionized water, 5.65 g. of 37% aqueous hydrochloric acid, 9.0 g. of dimethylaminoethyl methacrylate and 81.0 g. of methacryloxyethyl trimethyl ammonium chloride is swept with a nitrogen stream and warmed to 30° C. The pH of the mixture is adjusted to 2.0 with aqueous hydrochloric acid, and 1 ml. of a 0.1% solution of ferrous sulfate heptahydrate, 0.3 g. of ammonium persulfate and 0.3 g. of sodium hydrosulfite are added. In 25 minutes, the solution temperature rises to 47° C. Forty-five minutes after the first catalyst addition, 0.1 g. of ammonium persulfate and 0.1 g. of sodium hydrosulfite are added, followed thirty minutes later by 0.05 g. of ammonium persulfate and 0.05 g. of sodium hydrosulfite. The cooled polymer solution has a solids content of 29.3%.

To 150 g. of this polymer solution is added 75 g. of water containing 2 g. of sodium hydroxide. The pH of the solution is adjusted to 6.0 by the addition of 10% aqueous sodium hydroxide, warmed to 60° C., and 3.3 g. of epichlorohydrin is added in one portion. In one hour, quaternization of the amine is compete as determined by acid-base titration. The pH of the solution is adjusted to 2.0 with aqueous hydrochloric acid to give a polymer solution of 20.2% solids and a Brookfield viscosity of 180 centipoise.

(b) One part of the polymer of part (a), either as is or activated with aqueous caustic equivalent to the amount of structure IIIA incorporated into the polymer, is mixed with one part of a hydroxyethylated starch available commercially under the name Pen-Gum-280, and one part of kaolinite clay in a formulation at 30% solids. This formulation is applied to the same paper base stock as is used in Ex. (14)(b) by means of wire wound rods, and dried for one minute at 180° F. Surface resistivity at 15% relative humidity is measured using ASTM Method D256–61. The results are summarized in Table 7.

TABLE 7

| Conductivity aid | Conductivity aid, lbs./3,000 sq. ft. paper | Surface resistivity, ohms/square |
|---|---|---|
| Copolymer as is | 0.50 | 4.2×10¹¹ |
| Do | 1.0 | 2.8×10¹⁰ |
| Do | 2.5 | 9.8×10⁹ |
| Do | 5.0 | 2.2×10⁹ |
| Activated copolymer | 0.50 | 1.1×10¹¹ |
| Do | 1.0 | 9.9×10⁹ |
| Do | 2.5 | 1.6×10⁹ |
| Do | 5.0 | 8.3×10⁸ |
| Commercial product | 0.5 | 9.6×10¹⁰ |
| Do | 1.0 | 8.5×10⁹ |
| Do | 2.5 | 1.7×10⁹ |
| Do | 5.0 | 1.0×10⁹ |
| None (untreated paper) | | 1×10¹⁴ |

(18)(a) A glass polymerization vessel charged with 2730 g. of deionized water is sparged with nitrogen gas for one hour; then, 378 g. of 37% aqueous hydrochloric acid is added. The solution is cooled to 15° C. and 600 g. of dimethylaminoethyl methacrylate is added over 5 minutes. The temperature of the solution rises to 28° C., and 27.2 ml. of a 0.1 N solution of ferrous sulfate heptahydrate, 4.1 g. of ammonium persulfate and 4.1 g. of sodium hydrosulfite are added. The reaction temperature rises to 41° C. Fifty minutes after the first addition of catalyst, 0.55 g. of ammonium persulfate and 0.55 g. of sodium hydrosulfite are added. Thirty-five minutes later, 0.27 g. of ammonium persulfate and 0.27 g. of sodium hydrosulfite are added, followed in 50 minutes by a final initiator charge of 0.14 g. of ammonium persulfate and 0.14 g. of sodium hydrosulfite. The polymer solution, upon cooling to 25° C., has a solids content of 21.3%, a Brookfield viscosity of 75 centipoise, and an amine content of 1.07 milliequivalents per g., as determined by acid-base titration.

(b) A slurry of 19.7 g. of calcium hydroxide in 100 g. of water is added to 500 g. of the above polymer solution. The solution is stirred for 6 hours under a positive pressure (30 mm. of Hg) of methyl chloride; titration at this time indicates 84% of the amine present has been quaternized by methyl chloride. At this time, 5.9 g. of epichlorohydrin is added, and the mixture is stirred another 16 hours. Quaternization is essentially complete as determined by titration for amine functionality. The pH of the solution is adjusted to 1.2 with aqueous hydrochloric acid to give a resin solution of 22.7% total solids and a Brookfield viscosity of 50 centipoise. This material functions as a conductivity aid for electroconductive paper in a manner comparable to example (17)(a) above.

(19) Preparation of 50 DMAEMA·HNO₃/50 methoxyethoxyethyl acrylate quaternized with epichlorohydrin A glass polymerization flask fitted with a stirrer, three addition funnels, and a nitrogen gas inlet tube is charged with 366 g. of H₂O and 1 ml. of 0.1 FeSO₄·7H₂O solution. The solution is heated to 75° C and purged with nitrogen while the addition funnels (a, b, c) are charged in the following manner: (a) a solution of 0.3 g. ammonium persulfate in 50 g. of H₂O, (b) a mixture of 50 g. of dimethylaminoethyl methacrylate and 50 g. of methoxyethoxyethyl acrylate, and (c) 28.5 g. of 70.5% aqueous nitric acid. Then, 0.15 g. of sodium metabisulfite and 3.0 g. of charger (c) are added to the flask, and all the remaining solutions are gradually added over a one-hour period while the reaction temperature is maintained at 72–78° C. Another charge of 0.15 g. of sodium metabisulfite is added 30 minutes after the additions start. The cooled polymer solution has a Brookfield viscosity of 31 centipoises.

A 300 g. portion of the polymer solution is warmed to 60° C. and the pH is adjusted to 5.5 with 20% aqueous sodium hydroxide. Epichlorohydrin, 20.8 g. (1.30 equivalents) is added in one portion. After 2 hours at 60° C., quaternization is complete as judged by lack of amine titre upon acid-base titration. The pH is adjusted to 2.0 by the addition of concentrated nitric acid. The final resin has a brookfield viscosity of 40 centipoise at 25.0% total solids.

The resin is tested as a wet strength resin as described in (13)(c) above in a 1:1 blend of hardwood and softwood bleached kraft pulps beaten to 365 ml. Canadian Standard Freeness. The sheets are made at pH 7.8 with a basis weight of 37 lbs./3000 sq. ft. The activation of the resin is effected on a 10% polymer solids solution with 11% NaOH based on weight of resin solids over a period of two hours. The level of application is 0.5% based on fiber weight. The results are shown in the table.

TABLE

| Polymer (activated) | Wet tensile strength, lbs./in. width | |
| --- | --- | --- |
|  | 1 day | 28 days |
| Above resin | 3.7 | 4.3 |
| (12)(a)1 | 4.2 | 4.5 |
| (13)(b)1 | 4.5 | 4.8 |

(20) Preparation of a 50 DMAEMA·HNO₃/50 methoxyethyl acrylate copolymer quaternized with epichlorohydrin The polymerization apparatus described above is charged with 3256 g. of H₂O and 8 ml. of 0.1.

FeSO₄·7H₂O solution. The mixture is heated to 75° C. and purged with nitrogen while the three addition funnels (a, b, c) are charged as follows: (a) 4.0 g. of ammonium persulfate in 100 g. of H₂O. (b) a mixture of 400 g. of dimethylaminoethyl methacrylate and 400 g. of methoxyethyl acrylate, and (c) 228 g. of 70.5% aqueous nitric acid. The flask is then charged with 2.0 g. of sodium metabisulfite and 22.8 g. of charge (c). The remaining solutions are gradually added over 2 hours; another 2.0 g. portion of sodium metabisulfite is added one hour after the additions start. The temperature is maintained at 72–78° during the addition and for 45 minutes thereafter. The cooled polymer solution has a Brookfield viscosity of 42.5 centipoise at 22.0% solids and a polymeric amine titre of 0.58 milliequivalents per g.

A 600 g. portion of the above polymer is heated to 60° C. and the pH is adjusted to 6.2 with 20% aqueous sodium hydroxide. Then, 42.0 g. (1.30 equivalents) of epichlorohydrin is added in one portion. After 2.5 hours, quaternization is complete as judged by the lack of amine titre on acid base titration. The pH is adjusted to 1.5 with nitric acid, and the pressure is reduced to 100 mm. for 45 minutes to remove excess epichlorohydrin. The final resin has a Brookfield viscosity of 126 centipoise at 29.9% solids.

We claim:
1. A method which comprises mixing into paper pulp about 0.05% to 7% by weight solids, based on the weight of fibers, of a polymer composition obtained
   (1) by reacting an epihalohydrin with a polymer of an amine salt of the formula

$$H_2C=C(R)C(O)O—A—N(CH_3)_2·HY$$

wherein R is hydrogen or methyl, X is chlorine, bromine or iodine, and A is a ($C_2$–$C_6$) alkylene group group having at least two carbon atoms in a chain between the adjoined O and N atoms or A may be a polyoxyethylene group of the formula $$(CH_2CH_2O)_xCH_2CH_2$$

wherein $x$ is 1 to 11 or more, and Y is an anion, at room temperature to 80° C. in an aqueous medium at a pH of 2 to 6 or
   (2) by bringing (a) a copolymer of (A) about 0.25% to 99.5% by weight of a compound of the formula $$\left[H_2C=C(R)C(O)—O—A—\overset{CH_3}{\underset{CH_3}{\overset{|+}{N}}}—CH_2C(OH)H—CH_2X\right] Y^-$$

wherein R, X, A, and Y are as defined in (1) hereof with (B) at least one other monoethylenically unsaturated monomer having a group of the formula $H_2C=C<$ or (b) the polymer obtained in (1) hereof at a solids concentration of about 2% to about 10% to a pH of 9–12 just prior to use and maintaining the copolymer or polymer at that pH for 1–5 hours at 5–50° C.,
subsequently forming the pulp into a sheet and drying it thereby forming a paper.

2. A method which comprises mixing into paper pulp about 0.05% to 7% by weight solids, based on the weight of fibers, of a copolymer of (1) about 25 to about 95% by weight of at least one compound selected from compounds of the formulas $$\left[H_2C=C(R)C(O)—O—A—\overset{CH_3}{\underset{CH_3}{\overset{|+}{N}}}—CH_2C(OH)H—CH_2X\right] Y^-$$

and

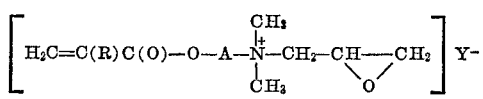

wherein
R is hydrogen or methyl,
X is iodine, bromine, or chlorine,
A is a ($C_2$–$C_6$) alkylene group having at least two carbon atoms in a chain between the adjoined O and N atoms or A may be a polyoxyethylene group of the formula $(CH_2CH_2O)_xCH_2CH_2$ wherein $x$ is at least 1, and
Y is an anion
the latter compound being present in an amount up to about one-third the weight of the former, with (2) at least one other monoethylenically unsaturated monomer having a group of the formula $H_2C{=}C{<}$ comprising an acid in an amount up to 25% by weight of the copolymer, the amount of monomeric material (1) being sufficient to impart cationic character to the copolymer, subsequently forming the pulp into a sheet and drying it, thereby forming a paper.

3. A method in accordance with claim 1 in which the acid in the copolymer amounts to 5 to 20 %thereof.

4. A method in accordance with claim 1 in which the acid in the copolymer amounts to 5 to 20% thereof and the copolymer also contains lower alkyl acrylate units in which the alkyl group contains 1 to 4 carbon atoms.

5. A method which comprises coating or saturating, and subsequently drying, a paper base with 0.05 to 7% by weight, based on the weight of the paper sheet, of a copolymer of 0.25 to 30% by weight of a compound of the formula

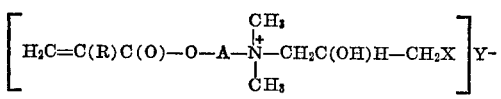

wherein
R is hydrogen or methyl,
X is iodine bromine, or chlorine,
A is a ($C_2$–$C_6$) alkylene group having at least two carbon atoms in a chain between the adjoined O and N atoms or A may be a polyoxyethylene group of the formula $(CH_2CH_2O)_xCH_2CH_2$ wherein $x$ is at least 1, and
Y is an anion
with the balance to make 100% of (acryloxyethyl) or (methacryloxyethyl)trimethylammonium chloride activated at a solids concentration of about 2 to about 50% by bringing it at a solids concentration of about 2% to about 10% to a pH of 9–12 just prior to use and maintaining it at that pH for 1–5 hours at 5–50° C., in suitable formulations to produce paper of low electrical resistivity.

6. A method which comprises coating or saturating, and subsequently drying, a paper base with 0.05 to 7% by weight, based on the weight of the paper sheet, of a copolymer of 0.25 to 30% by weight of a compound of the formula

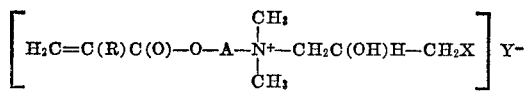

wherein
R is hydrogen or methyl,
X is iodine, bromine, or chlorine,
A is a ($C_2$–$C_6$) alkylene group having at least two carbon atoms in a chain between the adjoined O and N atoms or A may be a polyoxyethylene group of the formula $(CH_2CH_2O)_xCH_2CH_2$ wherein $x$ is at least 1, and
Y is an anion
in suitable formulations to produce paper of low electrical resistivity.

7. A paper or paperboard comprising a fibrous sheet, the fibers of which carry 0.05% to 7% by weight, based on the fiber weight, of a dried deposit of a polymer comprising 0.25 to 100% by weight of units of at least one of the formulas:

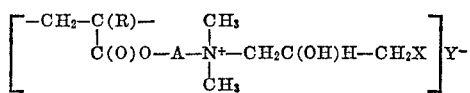

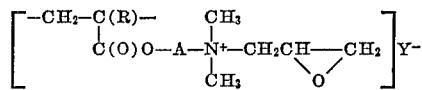

wherein
R is hydrogen or methyl,
X is iodine, bromine, or chlorine,
A is a ($C_2$–$C_6$) alkylene group having at least two carbon atoms in a chain between the adjoined O and N atoms or A may be a polyoxyethylene group of the formula $(CH_2CH_2O)_xCH_2CH_2$ wherein $x$ is at least 1, and
Y is an anion.

8. A paper according to claim 7 in which the polymer contains at least 25% by weight of the aforementioned units.

9. A paper according to claim 7 in which the polymer is a copolymer comprising the aforementioned units and acid units in an amount up to 25% by weight of the copolymer.

10. A paper according to claim 7 in which the polymer is a copolymer comprising the aforementioned units, acid units in an amount of about 5 to 20%, and lower alkyl acrylate units in which the alkyl group contains 1 to 4 carbon atoms.

References Cited

UNITED STATES PATENTS

| | | | |
|---|---|---|---|
| 3,418,301 | 12/1968 | Spivey | 260—86.7 |
| 3,497,482 | 2/1970 | Hwa | 260—486 R X |

S. LEON BASHORE, Primary Examiner

F. FREI, Assistant Examiner

U.S. Cl. X.R.

117—155 UA; 162—138

UNITED STATES PATENT OFFICE
CERTIFICATE OF CORRECTION

Patent No. 3,702,799  Dated November 14, 1972

Inventor(s) Sheldon N. Lewis, Richard F. Merritt and William D./Emmons

It is certified that error appears in the above-identified patent and that said Letters Patent are hereby corrected as shown below:

Col. 6, line 19, "100" should read --100%--.

Col. 9, line 5, correct the spelling of "There".

Col. 10, line 57, "Hcl" should read "HCl".

Col. 11, line 30, "37" should read --37%--.

Col. 12, line 48, "31.8% g." should read "31.8 g.".

Col. 16, line 37, correct the spelling of "complete".

Col. 17, line 34, "0.1" should read --0.1%--.

Col. 17, line 42, "charger" should read "charge".

Signed and sealed this 10th day of April 1973.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,702,799      Dated November 14, 1972

Inventor(s) Sheldon N. Lewis, Richard F. Merrit and William D. Emmons

It is certified that error appears in the above-identified patent and that said Letters Patent are hereby corrected as shown below:

Col. 18, Claim 1, Line 4, After the word "epihalohydrin" add -- of the formula $XCH_2\text{-}CHCH_2O$ --.

Signed and sealed this 16th day of July 1974.

(SEAL)
Attest:

McCOY M. GIBSON, JR.      C. MARSHALL DANN
Attesting Officer      Commissioner of Patents